(12) United States Patent
Lee et al.

(10) Patent No.: US 7,989,109 B2
(45) Date of Patent: Aug. 2, 2011

(54) ORGANIC ELECTROLYTIC SOLUTION AND LITHIUM BATTERY EMPLOYING THE SAME

(75) Inventors: Seok-soo Lee, Suwon-si (KR); Young-gyoon Ryu, Suwon-si (KR); Dong-joon Lee, Seoul (KR); Seung-sik Hwang, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 705 days.

(21) Appl. No.: 12/103,152

(22) Filed: Apr. 15, 2008

(65) Prior Publication Data
US 2009/0155696 A1  Jun. 18, 2009

(30) Foreign Application Priority Data
Dec. 14, 2007 (KR) .................. 10-2007-0131052

(51) Int. Cl.
*H01M 6/18* (2006.01)

(52) U.S. Cl. ........ 429/306; 429/317; 429/316; 429/330; 429/331; 429/332; 429/337; 429/342; 429/338; 252/62.2

(58) Field of Classification Search .................. 429/306, 429/317, 316, 330, 331, 332, 337, 342, 338; 252/62.2
See application file for complete search history.

(56) References Cited

U.S. PATENT DOCUMENTS
5,352,548 A   10/1994  Fujimoto et al.

FOREIGN PATENT DOCUMENTS
EP   0 320 907   *  6/1989
* cited by examiner

*Primary Examiner* — Laura S Weiner
(74) *Attorney, Agent, or Firm* — Christie, Parker & Hale, LLP

(57) ABSTRACT

An organic electrolytic solution for a lithium primary or secondary battery includes a lithium salt; an organic solvent; a radical initiator represented by Formula 1 below; and a polymerizable monomer represented by Formula 2 below:

$$R_1-N_2^+X^- \qquad \text{<Formula 1>}$$

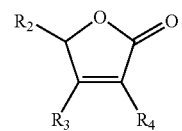

<Formula 2> wherein $R_1$, $R_2$, $R_3$, $R_4$, and $X^-$ are described herein. The organic electrolytic solution improves charge-discharge efficiency and increases cell capacity of the lithium primary or secondary battery.

12 Claims, 2 Drawing Sheets

ORGANIC ELECTROLYTIC SOLUTION AND LITHIUM BATTERY EMPLOYING THE SAME

CROSS-REFERENCE TO RELATED APPLICATIONS

This application claims the benefit of Korean Patent Application No. 2007-131052, filed on Dec. 14, 2007, in the Korean Intellectual Property Office, the disclosure of which is incorporated herein by reference.

BACKGROUND OF THE INVENTION

1. Field of the Invention

Aspects of the present invention relate to an organic electrolytic solution and a lithium battery employing the same, and more particularly, to an organic electrolytic solution including a radical initiator and a polymerizable monomer and a lithium battery employing the same.

2. Description of the Related Art

Batteries are used as power sources for portable electronic devices, such as video cameras, mobile phones, laptop computers, and the like. In particular, rechargeable lithium batteries have 3 times the energy density per unit weight as Pb batteries, Ni—Cd batteries, Ni—H batteries, and Ni—Zn batteries, and the rechargeable lithium batteries can be quickly charged and recharged. Lithium batteries operate at high operating voltages so that an aqueous electrolytic solution cannot be used and the aqueous electrolytic solution vigorously reacts with lithium. In general, an organic electrolytic solution is used in lithium batteries. The organic electrolytic solution is prepared by dissolving a lithium salt in an organic solvent. The organic solvent may be stable at high voltages and has high ionic conductivity, high permittivity, and low viscosity.

When a lithium battery uses a carbonate-based polar non-aqueous solvent, an irreversible reaction in which charges are excessively used due to a side reaction between carbon in an anode and an electrolytic solution occurs during initial charging. As a result of such an irreversible reaction, a passivation layer, such as a solid electrolyte interface (SEI) membrane, is formed on the surface of the anode. The SEI prevents decomposition of the electrolytic solution during charging and discharging and acts as an ion tunnel. The SEI passes only lithium ions therethrough during charging and discharging and blocks the organic solvent. Only the lithium ions are intercalated into the carbon anode, and the organic solvent is not intercalated with the lithium ions, and thus a breakdown of the anode structure is prevented. However, an excessive amount of charges is consumed in the formation of the SEI, and thus initial efficiency of the lithium battery is reduced. In addition, the SEI has a higher resistance than the anode itself, and thus cell capacity of the lithium battery is decreased. Therefore, when the SEI is formed, it is preferable that the decomposition of the electrolytic solution is minimized. For example, U.S. Pat. No. 5,352,548 discloses a method of preventing decomposition of a solvent adding a vinylene carbonate, or a derivative thereof, to an electrolytic solution, and then forming a film on a surface of a negative electrode through a reduction and decomposition reaction of the additive.

SUMMARY OF THE INVENTION

According to an aspect of the present invention, there is provided an organic electrolytic solution including a lithium salt; an organic solvent; a radical initiator represented by Formula 1 below; and a polymerizable monomer represented by Formula 2 below:

<Formula 1> wherein $R_1$ is a substituted or unsubstituted $C_{1-20}$ alkyl group, a substituted or unsubstituted $C_{6-20}$ aryl group, or a substituted or unsubstituted $C_{7-20}$ alkylaryl group, and $X^-$ is an anion,

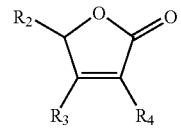

<Formula 2> wherein $R_2$, $R_3$, and $R_4$ are each independently hydrogen, a halogen group, a halogenated $C_{1-4}$ alkyl group, a $C_{1-6}$ alkylcarbonyl group, a $C_{1-6}$ alkoxycarbonyl group, a nitro group, or a halogenated benzyl group.

According to another aspect of the present invention, there is provided a lithium battery comprising: a cathode; an anode; and the organic electrolytic solution.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
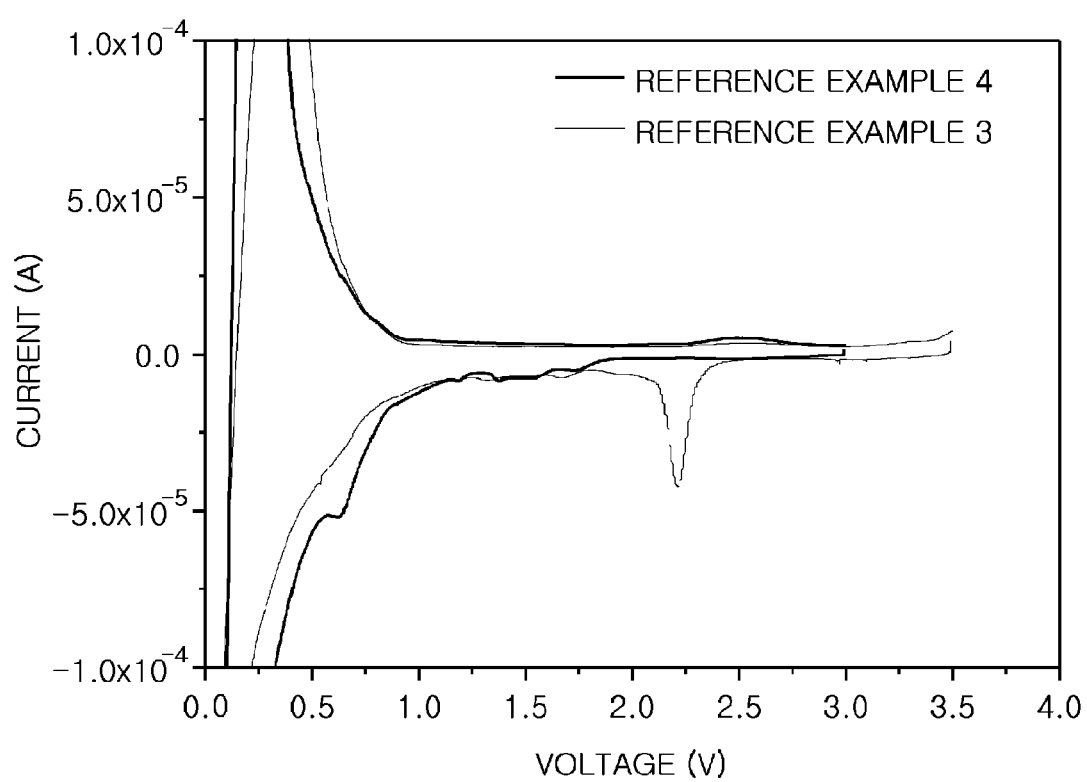
FIG. 1 is a graph showing cyclovoltametry test results of each of the lithium batteries manufactured in Reference Examples 3 and 4.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

Aspects of the present invention provide an organic electrolytic solution including a lithium salt; an organic solvent; a radical initiator represented by Formula 1 below; and a polymerizable monomer represented by Formula 2 below:

<Formula 1> wherein $R_1$ is a substituted or unsubstituted $C_{1-20}$ alkyl group, a substituted or unsubstituted $C_{6-20}$ aryl group, or a substituted or unsubstituted $C_{7-20}$ alkylaryl group, and $X^-$ is an anion, and

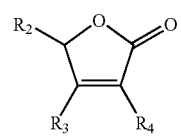

<Formula 2> wherein $R_2$, $R_3$, and $R_4$ are each independently hydrogen, a halogen group, a halogenated $C_{1-4}$ alkyl group, a $C_{1-6}$ alkylcarbonyl group, a $C_{1-6}$ alkoxycarbonyl group, a nitro group, or a halogenated benzyl group. The radical initiator is an electrochemical radical initiator that receives electrons from an anode to form a radical. The radical formed by the reduction is reacted with the polymerizable monomer to form a polymer film (or SEI) on a surface of the anode. Due to the presence of the radical initiator, a charge amount consumed in the formation of SEI is significantly reduced. Consequently, the irreversible capacity loss of the battery is decreased, resulting in improvement of charge-discharge efficiency. In the case that the radical initiator does not exist, a very large amount of charges is consumed in the polymerization of the polymerizable monomer. The inclusion of the radical initiator decreases the deterioration of the anode when polymerizing the polymerizable monomer.

The radical initiator may be a diazonium salt compound. When the radical initiator receives electrons from the anode, nitrogen is separated from the diazonium salt and a radical remains. A process in which the radical initiator is reduced to form a radical is confirmed in FIG. 1, which is a graph showing cyclovoltametry test results of each of the lithium batteries manufactured in Reference Examples 3 and 4, described below. Referring to FIG. 1, when a change in current with respect to voltage of a lithium battery using an organic electrolytic solution that contains the diazonium salt as a radical initiator is measured using cyclovoltametry, a reduction peak is observed at about 2.3 V with respect to lithium metal region as shown with respect to Reference Example 3. However, in a lithium battery using an organic electrolytic solution that does not contain the radical initiator, the reduction peak is not observed as shown with respect to Reference Example 4.

The unsubstituted $C_{1-20}$ alkyl group used herein may be methyl, ethyl, propyl, isobutyl, n-butyl, sec-butyl, pentyl, iso-amyl, hexyl, heptyl, octyl, nonyl, decyl, dodecyl, or the like.

The unsubstituted $C_{6-20}$ aryl group used herein refers to a $C_{6-20}$ carbocyclic aromatic system containing at least one ring, wherein the rings can be fused with each other or bound to each other by a single bond, or the like. The $C_{6-20}$ aryl group may be a phenyl group, a naphthyl group, a biphenyl group, or the like.

The unsubstituted $C_{7-20}$ alkylaryl group used herein refers to a group in which one of the hydrogen atoms in the $C_{1-20}$ alkyl group is substituted with an aryl group. For example, the $C_{7-20}$ alkylaryl group may be a benzyl group, or the like.

According to another embodiment of the present invention, the substituted $C_{1-20}$ alkyl, $C_{6-20}$ aryl, and $C_{7-20}$ alkylaryl groups may each independently have a substituent such as a halogen, a nitro group, a halogenated $C_{1-4}$ alkyl group, a $C_{1-6}$ alkylcarbonyl group, a $C_{1-6}$ alkoxycarbonyl group, a halogenated benzyl group, or the like. The halogenated $C_{1-4}$ alkyl group is a $C_{1-4}$ alkyl group in which at least one hydrogen of the alkyl group is substituted with a halogen and may be a trifluoromethyl group, a pentafluoroethyl group, or the like. The $C_{1-6}$ alkylcarbonyl group may be an acyl group such as a methylcarbonyl group, or the like. The $C_{1-6}$ alkoxycarbonyl group may be an alkoxycarbonyl group such as a methoxy carbonyl group, or the like. The halogenated benzyl group is a benzyl group in which at least one hydrogen of the benzyl group is substituted with a halogen, and may be a 4-fluorobenzyl group, or the like.

$X^-$, which is the anion in Formula 1, may be $BF_4^-$, $Cl^-$, $PF_6^-$, $ClO_4^-$, $HSO_4^-$, $CF_3SO_3^-$, $C_2F_5SO_3^-$, $(CF_3SO_2)_3C^-$, $(C_2F_5SO_2)_3C^-$, $(CF_3SO_2)_2N^-$, $(CF_2F_5SO_2)_2N^-$, a mixture thereof, or the like.

According to another embodiment of the present invention, the radical initiator may be a compound represented by Formula 3 below:

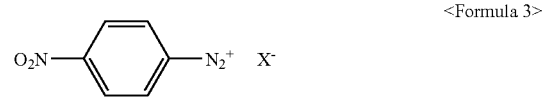

<Formula 3> wherein $X^-$, which is an anion, may be $BF_4^-$, $Cl^-$, $PF_6^-$, $ClO_4^-$, $HSO_4^-$, $CF_3SO_3^-$, $C_2F_5SO_3^-$, $(CF_3SO_2)_3C^-$, $(C_2F_5SO_2)_3C^-$, $(CF_3SO_2)_2N^-$, $(CF_2F_5SO_2)_2N^-$, a mixture thereof, or the like. The polymerizable monomer may contain an electron withdrawing group. The electron withdrawing group improves the reactivity of the double bond contained in the polymerizable monomer with the radical.

In the polymerizable monomer represented by Formula 2, $R_2$, $R_3$, and $R_4$ are each independently hydrogen, a halogen group, a halogenated $C_{1-4}$ alkyl group, a $C_{1-6}$ alkylcarbonyl group, a $C_{1-6}$ alkoxycarbonyl group, a nitro group, or a halogenated benzyl group. The halogenated $C_{1-4}$ alkyl group, the $C_{1-6}$ alkylcarbonyl group, and the $C_{1-6}$ alkoxycarbonyl group of $R_2$, $R_3$, and $R_4$ may be the same as described above with respect to the $R_1$ in Formula 1.

According to another embodiment of the present invention, the polymerizable monomer may be a lactone of 5,5,5-trifluoro-4-hydroxy-2-pentenoic acid as represented by Formula 4 below:

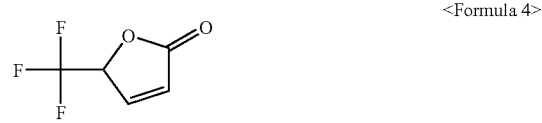

<Formula 4>

According to another embodiment of the present invention, a reduction potential of the radical initiator may be higher than a reduction potential of the polymerizable monomer. Since the reduction potential of the radical initiator is higher than that of the polymerizable monomer, the radical initiator is reduced by electrons supplied from an anode prior to the reduction of the polymerizable monomer when a lithium battery is charged. Preferably, the reduction potential of the radical initiator may be 2.1 V or more with respect to a lithium metal (Li/Li$^+$), and the reduction potential of the polymerizable monomer may be less than 2.0 V with respect to the lithium metal.

According to another embodiment of the present invention, the amount of the radical initiator may be in a range of 0.1 to 5 wt % based on the total weight of the organic electrolytic solution; however, aspects of the present invention are not limited thereto and an appropriate amount of the radical initiator can be used, if necessary. The amount of the radical initiator within these ranges is suitable.

According to another embodiment of the present invention, the amount of the polymerizable monomer may be in a range of 0.1 to 10 wt % based on the total weight of the organic electrolytic solution. However, aspects of the present invention are not limited thereto and an appropriate amount of the polymerizable monomer can be used, if necessary. The amount of the polymerizable monomer within these ranges is suitable.

The lithium salt may be any lithium salt that is conventionally used in a lithium battery, and may be at least one compound selected from the group comprising $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$. However, aspects of the present invention are not limited thereto. In an organic electrolytic solution according to another embodiment of the present invention, the concentration of the lithium salt may be in a range of 0.5 to 2 M. When the concentration of the lithium salt is less than 0.5 M, the conductivity of the organic electrolytic solution decreases, and thus the performance of the organic electrolytic solution is decreased. On the other hand, when the concentration of the lithium salt is greater than 2.0 M, the viscosity of the organic electrolytic solution increases, and thus the mobility of lithium ions therein is decreased. However, the concentration of the lithium salt outside the range of 0.5 to 2 M described above may be used as aspects of the present invention are not limited thereto.

According to another embodiment of the present invention, the organic solvent may be a high dielectric constant solvent, a solvent having a low boiling point, or a mixture thereof. The high dielectric constant solvent used herein is not particularly limited and may be any solvent that is conventionally used in the art. For example, the high dielectric constant solvent may be a cyclic carbonate such as ethylene carbonate, propylene carbonate, or butylene carbonate, γ-butyrolactone, or the like. The solvent having a low boiling point may be any solvent that is conventionally used in the art and may be a chain carbonate such as dimethyl carbonate, ethylmethyl carbonate, diethyl carbonate, or dipropyl carbonate, dimethoxyethane, diethoxyethane, fatty acid ester derivatives, or the like.

In a mixed solvent of the high dielectric constant solvent and the solvent having a low boiling point, a mixing volume ratio of the high dielectric constant solvent to the solvent having a low boiling point may be in the range of 1:1 to 1:9. When the mixing volume ratio of the high dielectric constant solvent to the solvent having a low boiling point is outside such range, the discharge capacity and charge-discharge lifetime of the lithium battery can be degraded, however, aspects of the present invention are not limited thereto.

Aspects of the present invention also provide a lithium battery including: a cathode; an anode; and the organic electrolytic solution according to the above embodiments of the present invention. The lithium battery is not particularly limited, and may be a lithium secondary battery, such as a lithium ion battery, a lithium ion polymer battery, a lithium sulfur battery, or the like, or a lithium primary battery.

The lithium battery can be manufactured as follows. First, a cathode active material composition in which a cathode active material, a conducting agent, a binder, and a solvent are mixed is prepared. The cathode active material composition is directly coated on an aluminum current collector and dried to manufacture the cathode electrode. Alternatively, the cathode active material composition is cast on a separate support, and then a cathode active material film separated from the support is laminated on the aluminum current collector to manufacture the cathode electrode.

The cathode active material is a lithium-containing metal oxide, and may be any cathode active material that is conventionally used in the art. For example, the cathode active material may be $LiCoO_2$, $LiMn_xO_{2x}$ where x=1 or 2, $LiNi_{x-1}Mn_xO_{2x}$ where 0<x<1, $LiNi_{1-x-y}Co_xMn_yO_2$ where $0 \leq x \leq 0.5$ and $0 \leq y \leq 0.5$, or the like. Carbon black is used as the conductive agent. Examples of the binder include a vinylidene fluoride/hexafluoropropylene copolymer, polyvinylidenefluoride, polyacrylonitrile, polymethylmethacrylate, polytetrafluoroethylene, mixtures thereof, a styrene butadiene rubber-based polymer, and the like. As the solvent, N-methylpyrolidone, acetone, water, or the like, is used. Herein, the amounts of the cathode active material, the conductive agent, the binder, and the solvent used in the manufacture of the lithium battery are amounts generally acceptable in the art.

Next, an anode active material composition is prepared by mixing an anode active material, a conductive agent, a binder, and a solvent together, in the same manner as in the manufacture of the cathode electrode. The anode active material composition is directly coated on a copper current collector and dried to manufacture the anode electrode. Alternatively, the anode active material composition is cast on a separate support, and then an anode active material film separated from the support is laminated on the copper current collector to manufacture the anode electrode. Herein, the amounts of the anode active material, the conductive agent, the binder, and the solvent used in the manufacture of the lithium battery are amounts generally acceptable in the art. The anode active material may be a silicone metal, a silicone thin film, a lithium metal, a lithium alloy, a carbon material, graphite, or the like. The conducting agent, the binder, and the solvent in the anode active material composition may be the same as those in the cathode active material composition.

A plasticizer can be added to the cathode active material composition and the anode active material composition to form pores in the cathode active material composition and the anode active material composition.

Next, the cathode and the anode are disposed about opposite sides of a separator. The separator may be any separator that is commonly used for lithium batteries. The separator may have low resistance to migration of ions in the electrolyte and have an excellent electrolyte-retaining ability. Examples of the separator include glass fiber, polyester, Teflon®, polyethylene, polypropylene, polytetrafluoroethylene (PTFE), a combination thereof, and a material which may be in nonwoven or woven fabric form. In particular, a windable separator including polyethylene, polypropylene, or the like can be used for a lithium ion battery. A separator that can retain a large amount of an organic electrolytic solution may be used for a lithium-ion polymer battery.

A method of forming these separators will now be described. A polymer resin, a filler, and a solvent are mixed to prepare a separator composition. The separator composition is directly coated on the electrode and then dried to form a separator film. Alternately, the separator composition can be cast onto a separate support, dried, detached from the separate support, and finally laminated on one of the electrodes, thereby forming a separator film.

Any polymer resin that is commonly used for binding electrode plates in lithium batteries can be used without limitation. Examples of the polymer resin include a vinylidenefluoride/hexafluoropropylene copolymer, polyvinylidenefluoride (PVDF), polyacrylonitrile, polymethylmethacrylate and a mixture thereof. A vinylidenefluoride/hexafluoropropylene copolymer having 8 to 25 wt % of hexafluoropropylene may be used as the polymer resin.

The separator is disposed between the cathode electrode and the anode electrode to form an electrode assembly. The electrode assembly is wound or folded and then sealed in a cylindrical or rectangular battery case. Then, an organic electrolyte solution is injected into the battery case to complete the lithium ion battery. Alternatively, a plurality of electrode assemblies may be stacked in a multi-cell structure and impregnated with an organic electrolyte solution. The resultant may be put into a pouch and hermetically sealed, thereby completing a lithium ion polymer battery.

Aspects of the present invention will now be described in more detail with reference to the following examples. However, these examples are for illustrative purposes only and are not intended to limit the scope of the present invention.

Example 1

Organic Electrolytic Solution 4-nitrobenzodiazonium tetrafluoroborate, as a radical initiator, and Compound 4 (a lactone of 5,5,5-trifluoro-4-hydroxy-2-pentenoic acid), as a polymerizable monomer, were added to propylene carbonate, as a solvent. Herein, amounts of the radical initiator and the polymerizable monomer were 1 wt % and 3 wt %, respectively, based on a total weight of the organic electrolytic solution. As a lithium salt, 1.0 M $LiClO_4$ was used. Thus, the manufacture of the organic electrolytic solution was completed.

Example 2

Organic Electrolytic Solution

An organic electrolytic solution was prepared in the same manner as in Example 1, except that 5 wt % of Compound 4 was used as the polymerizable monomer.

Comparative Example 1

Organic Electrolytic Solution

An organic electrolytic solution was prepared in the same manner as in Example 1, except that neither 4-nitrobenzodiazonium tetrafluoroborate nor Compound 4 was added such that the organic electrolytic solution included only the 1.0M $LiClO_4$ dissolved in the propylene carbonate solvent.

Comparative Example 2

Organic Electrolytic Solution

An organic electrolytic solution was prepared in the same manner as in Example 1, except that 4-nitrobenzodiazonium tetrafluoroborate as the radical initiator was not added such that the organic electrolytic solution included 3 wt % of the polymerizable monomer of Compound 4 and the 1.0M $LiClO_4$ lithium salt dissolved in the propylene carbonate solvent.

Comparative Example 3

Organic Electrolytic Solution

An organic electrolytic solution was prepared in the same manner as in Example 2, except that 4-nitrobenzodiazonium tetrafluoroborate as the radical initiator was not added such that the organic electrolytic solution included 5 wt % of the polymerizable monomer of Compound 4 and the 1.0M $LiClO_4$ lithium dissolved in the propylene carbonate solvent.

Reference Example 1

Organic Electrolytic Solution 4-nitrobenzodiazonium tetrafluoroborate, as a radical initiator, was added to a mixed solvent composed of 30 volume % of ethylene carbonate and 70 volume % of diethyl carbonate. Herein, the amount of the radical initiator was 1 wt % based on the total weight of an organic electrolytic solution. As a lithium salt, 1.3 M $LiPF_6$ was used. Thus, the manufacture of the organic electrolytic solution was completed.

Reference Example 2

Organic Electrolytic Solution

An organic electrolytic solution was prepared in the same manner as in Reference Example 1, except that 4-nitrobenzodiazonium tetrafluoroborate as the radical initiator was not added such that the organic electrolytic solution included the 1.3 M $LiPF_6$ lithium salt dissolved in the 30 volume % ethylene carbonate and 70 volume % diethyl carbonate solvent.

Example 3

Lithium Battery

A graphite powder (mesocarbon microbeads (MCMB), from Osaka Gas Company) and a binder in which 5 wt % of polyvinylidenefluoride (PVDF) was dissolved in N-methylpyrrolidone (NMP) in a weight ratio of 95:5 were added to an agate mortar and mixed together to prepare a slurry. The slurry was cast on a copper foil having a thickness of 19 μm by using a doctor blade with a gap of 100 μm. Then, the resultant was put into an oven at 90° C. and dried for about 2 hours to evaporate the NMP. Then, the resultant was dried in a vacuum oven at 120° C. for 2 hours to completely evaporate the NMP. The obtained resultant was roll-pressed to manufacture an anode having a thickness of 50 μm.

The anode, a lithium metal counter electrode, polyethylene separator, and the organic electrolytic solution prepared in Example 1 were used to manufacture a 2016 size coin cell.

Example 4 and Comparative Examples 4 Through 6

Lithium Batteries

Coin cells were manufactured in the same manner as in Example 3, except that each of the organic electrolytic solutions prepared in Example 2 and Comparative Examples 1 through 3 were used instead of the organic electrolytic solution of Example 1. Specifically, Example 4 was manufactured in the same manner as in Example 3 except that the organic electrolytic solution of Example 2 was used therein; Comparative Example 4 was manufactured in the same manner as in Example 3 except that the organic electrolytic solution of Comparative Example 1 was used therein; Comparative Example 5 was manufactured in the same manner as in Example 3 except that the organic electrolytic solution of Comparative Example 2 was used therein; and Comparative Example 6 was manufactured in the same manner as in Example 3 except that the organic electrolytic solution of Comparative Example 3 was used therein.

Reference Example 3

Lithium Battery

A coin cell was manufactured in the same manner as in Example 3, except that the organic electrolytic solution prepared in Reference Example 1 was used instead of the organic electrolytic solution of Example 1.

Reference Example 4

Lithium Battery

A coin cell was manufactured in the same manner as in Example 3, except that the organic electrolytic solution prepared in Reference Example 2 was used instead of the organic electrolytic solution of Example 1.

Evaluation Example 1

Evaluation of Whether a Radical Initiator was Reduced

Cyclovoltametry was used to determine whether a radical initiator of each of the coin cells manufactured in Reference Examples 3 and 4 was reduced. The measurement results are shown in FIG. 1. As shown in FIG. 1, the coin cell of Reference Example 3 including the radical initiator had a reduction peak at around about 2.3 V; however, the coin cell of Reference Example 4 did not have a reduction peak. As a result, it can be seen that the radical initiator of the coin cell of Reference Example 3 was reduced.

Evaluation Example 2

Evaluation of Initial Charge-Discharge Characteristics

Figure 2:
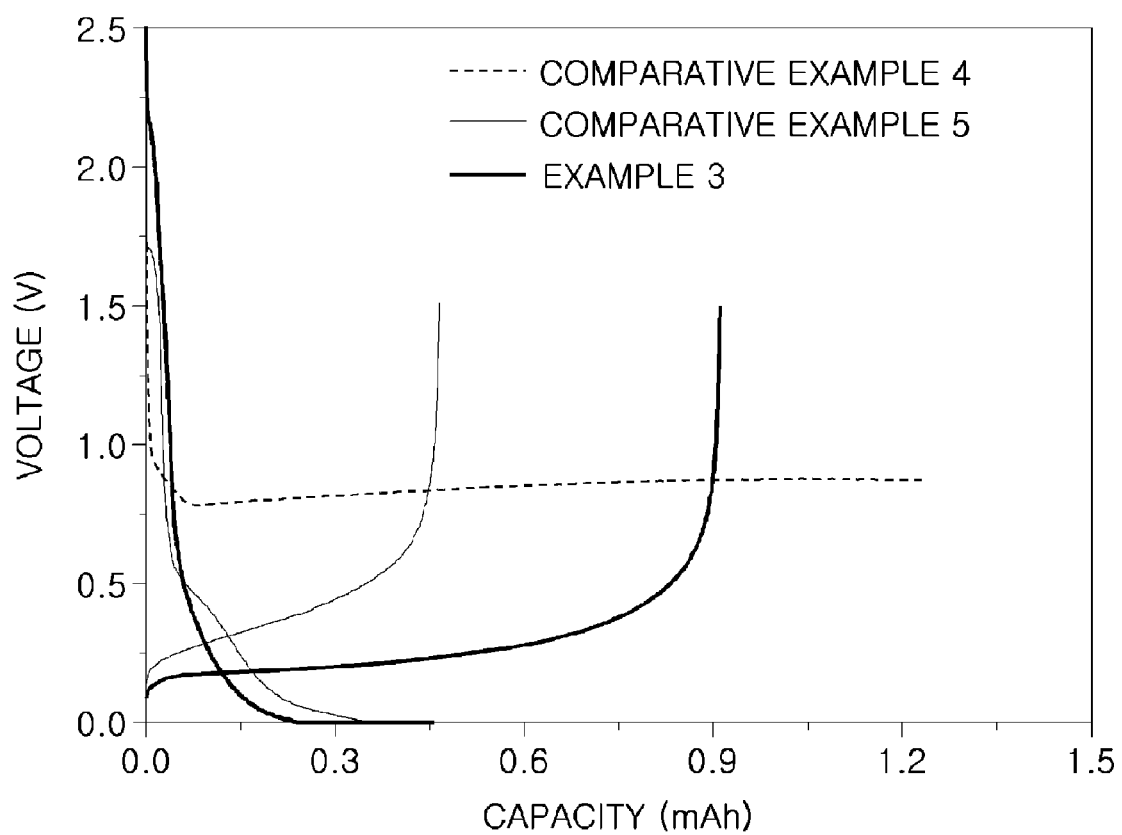
FIG. 2 is a graph showing charge-discharge test results of each of the lithium batteries manufactured in Example 3 and Comparative Examples 4 and 5.

The coin cells of Example 3 and Comparative Examples 4 and 5, which had theoretical cell capacities of 1.19 mAh, were each charged with a constant current at a 0.1 C rate until the voltage of the cell reached 0.001 V against the Li counter electrode. Then, the coin cells were each charged with a constant voltage of 0.001 V until the current of the cell was decreased to a 0.05 C rate. Then, the coin cells were each discharged with a constant current at a 0.1 C rate until the voltage of the cell reached 1.5 V. As a result, charge-discharge capacities of the coin cells were obtained, and initial charge-discharge efficiencies of the coin cells were calculated therefrom. The initial charge-discharge efficiencies of the coin cells are represented by Equation 1 below. The first cycle charge-discharge test results are shown in FIG. 2 and Table 1 below.

Initial charge-discharge efficiency(%) = (1$^{st}$ cycle discharge capacity / 1$^{st}$ cycle charge capacity)*100  <Equation 1>

TABLE 1

|  | 1$^{st}$ cycle charge capacity [mAh] | 1$^{st}$ cycle discharge capacity [mAh] | Charge-discharge efficiency (%) |
| --- | --- | --- | --- |
| Comparative Example 4 | — | — | — |
| Comparative Example 5 | 0.65 | 0.46 | 71.11 |
| Example 3 | 1.1 | 0.91 | 83.79 |

As shown in Table 1 and FIG. 2, the coin cell of Example 3 including the radical initiator according to aspect of the present invention had improved charge-discharge efficiency compared to the coin cell of Comparative Example 5, which did not include the radical initiator. In addition, the coin cell of Example 3 had increased cell capacity compared to the coin cell of Comparative Example 5. In the case of the coin cell of Comparative Example 4, the solvent was decomposed, and thus the cell capacity of the coin cell could not be measured.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic electrolytic solution, comprising:
a lithium salt;
an organic solvent;
a radical initiator represented by Formula 1 below; and
a polymerizable monomer represented by Formula 2 below:

<Formula 1> wherein $R_1$ is a substituted or unsubstituted $C_{1-20}$ alkyl group, a substituted or unsubstituted $C_{6-20}$ aryl group, or a substituted or unsubstituted $C_{7-20}$ alkylaryl group, $X^-$ is at least one anion selected from the group consisting of $BF_4^-$, $Cl^-$, $PF_6^-$, $ClO_4^-$, $HSO_4^-$, $CF_3SO_3^-$, $C_2F_5SO_3^-$, $(CF_3SO_2)_3C^-$, $(C_2F_5SO_2)_3C^-$, $(CF_3SO_2)_2N^-$, and $(CF_2F_5SO_2)_2N^-$, and mixtures thereof, and

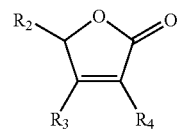
<Formula 2> wherein $R_2$, $R_3$, and $R_4$ are each independently hydrogen, a halogen group, a halogenated $C_{1-4}$ alkyl group, a $C_{1-6}$ alkylcarbonyl group, a $C_{1-6}$ alkoxycarbonyl group, a nitro group, or a halogenated benzyl group.

2. The organic electrolytic solution of claim 1, wherein substituents of the substituted $C_{1-20}$ alkyl group, the substituted $C_{6-20}$ aryl group, and the substituted $C_{7-20}$ alkylaryl group are each independently a halogen, a nitro group, a halogenated $C_{1-4}$ alkyl group, a $C_{1-6}$ alkylcarbonyl group, a $C_{1-6}$ alkoxycarbonyl group, or a halogenated benzyl group.

3. The organic electrolytic solution of claim 1, wherein the radical initiator is a compound represented by Formula 3 below:

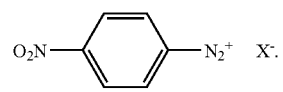
<Formula 3>

4. The organic electrolytic solution of claim 1, wherein the polymerizable monomer is a compound represented by Formula 4 below:

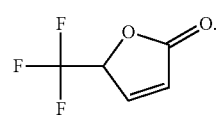
<Formula 4>

5. The organic electrolytic solution of claim 1, wherein a reduction potential of the radical initiator is higher than a reduction potential of the polymerizable monomer.

6. The organic electrolytic solution of claim 1, wherein an amount of the radical initiator is 0.1 to 5 wt % based on the total weight of the organic electrolytic solution.

7. The organic electrolytic solution of claim 1, wherein an amount of the polymerizable monomer is 0.1 to 10 wt % based on the total weight of the organic electrolytic solution.

8. The organic electrolytic solution of claim 1, wherein a concentration of the lithium salt is 0.5 to 2.0 M.

9. The organic electrolytic solution of claim 1, wherein the organic solvent is at least one of a high dielectric constant solvent and/or a solvent having a low boiling point.

10. The organic electrolytic solution of claim 9, wherein the high dielectric constant solvent is at least one of ethylene carbonate, propylene carbonate, butylene carbonate, and/or γ-butyrolactone.

11. The organic electrolytic solution of claim 9, wherein the solvent having a low boiling point is at least one of dimethyl carbonate, ethylmethyl carbonate, diethyl carbonate, dipropyl carbonate, dimethoxyethane, diethoxyethane, and/or fatty acid ester derivatives.

12. A lithium battery, comprising:
a cathode;
an anode; and
the organic electrolytic solution according to claim 1.

* * * * *